United States Patent [19]

Ramesohl et al.

[11] 4,315,734
[45] Feb. 16, 1982

[54] METHOD AND APPARATUS FOR DRYING AND PULVERIZING COAL

[75] Inventors: Hubert Ramesohl, Bergisch Gladbach; Horst Herchenbach, Troisdorf, both of Fed. Rep. of Germany

[73] Assignee: Klöckner-Humboldt-Deutz AG, Fed. Rep. of Germany

[21] Appl. No.: 174,131

[22] Filed: Jul. 31, 1980

[30] Foreign Application Priority Data

Aug. 1, 1979 [DE] Fed. Rep. of Germany ....... 2931214

[51] Int. Cl.³ ............................................... E27B 15/00
[52] U.S. Cl. ...................................... 432/14; 110/232; 110/347; 432/106
[58] Field of Search .......................... 432/14, 58, 106; 110/106, 232, 347, 263, 233

[56] References Cited

U.S. PATENT DOCUMENTS

| | | | |
|---|---|---|---|
| 4,152,110 | 5/1979 | Jukkola et al. | 432/14 |
| 4,226,586 | 10/1980 | Brachthauser et al. | 432/106 |
| 4,236,886 | 12/1980 | Ansen et al. | 110/347 X |
| 4,248,639 | 2/1981 | Quittkat | 432/14 X |

*Primary Examiner*—Edward G. Favors
*Attorney, Agent, or Firm*—Hill, Van Santen, Steadman, Chiara & Simpson

[57] ABSTRACT

Method and apparatus for drying and pulverizing coal which is to be used as a powdered fuel in the manufacture of cement. Air which has been heated in the cooling step of the cement making process is passed through a tertiary air conduit for delivery to a calcining step of the cement making process, and at least a part of the dust-laden air from the grinding step is introduced into the tertiary air conduit.

13 Claims, 1 Drawing Figure

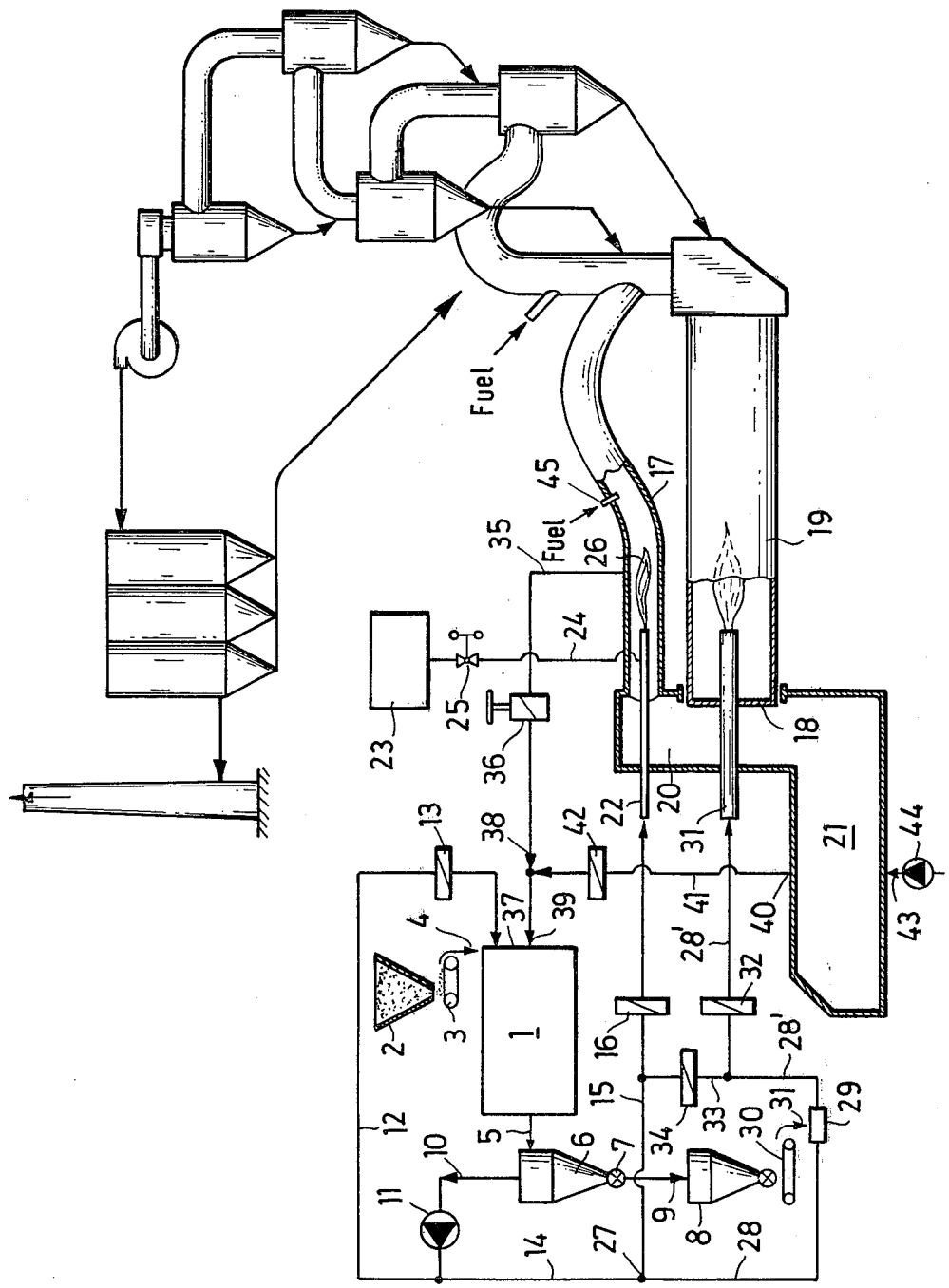

METHOD AND APPARATUS FOR DRYING AND PULVERIZING COAL

BACKGROUND OF THE INVENTION

1. Field of the Invention

This invention is in the field of drying and pulverizing coal to supply coal dust serving as a fuel in the manufacture of cement, the cement making system including a pre-heater, a calcinator, a rotary tubular kiln, a cooler, as well as a tertiary air conduit supplying the calcinator with heated air from the cooler.

2. Description of the Prior Art

Systems for cement manufacture frequently employ the so-called direct-fired coal mills for firing the rotary tubular kilns in which the raw material for cement is sintered. In these direct-fired coal mills, raw coal is simultaneously ground and dried. The blower, which blows hot air through the mill from the cooler for drying and screening the coal simultaneously, serves as the primary air blower. The pulverized coal is blown directly from the mill into the kiln. Raw coal is distributed to the mill by means of a hopper and a metering device which is driven by a controllable motor operating in accordance with the required conditions of operation. The discharge of coal dust into the rotary tubular kiln does not depend solely on the speed of the metering apparatus in front of the mill, but also depends on the amount of air which is introduced into the kiln by means of the mill blower. By means of controlling the speed of the mill blower, the coal dust discharge and the flame position in the rotary tubular kiln can be affected. (See, for example, the periodical "Zement-Kalk-Gips", No. 11, 1956, Page 491). In this publication it is stated that automatic operation in rotary tubular kilns with direct-fired coal mills has not been yet capable of realization.

The difficulty results because the discharge of coal dust and the injection of primary air into the rotary kiln are functionally coupled to one another and are therefore closely interconnected. An increase of the amount of primary air, for example, by increasing the speed of the mill blower results in more coal dust being delivered to the kiln. In so doing, however, the grain structure changes. The coal dust no longer has the same degree of fineness as previously because the sifting means between the mill and the kiln allows coarser ground matter to pass through because of the greater amount of air. Accordingly, the formation and the position of the flame cone in the kiln is significantly changed. It is possible to achieve and maintain a more or less stable kiln operation only by means of very careful servicing by trained personnel. With burning systems at the present state of development, particularly with calciners and secondary firing, the difficulty in coupling a coal grinding system to a burning system increases significantly due to the necessity for correlating the amounts of powdery coal and gas.

SUMMARY OF THE INVENTION

The present invention provides a means for functionally coupling the drying and pulverizing of coal with the burning system of a cement making operation in such manner that automatic operation both of the grinding system as well as of the burning system can be achieved in an uncomplicated manner which is controllable in terms of process variables without a change in the operating characteristics of one system resulting in a disadvantageous influence on the other system.

More specifically, the present invention relates to a coal grinding system for supplying a burning system used for cement manufacture and containing a pre-heater, a calciner, a rotary tubular kiln, and a cooler, as well as a tertiary air conduit supplying the calciner with heated air from the cooler. In the present invention, the dust-laden exhaust air which occurs during the grinding of the coal is at least partially introduced into the tertiary air conduit.

BRIEF DESCRIPTION OF THE DRAWINGS

The single FIGURE in the drawings shows somewhat schematically a grinding system for drying and pulverizing coal in conjunction with the remainder of a burning system for manufacturing cement.

DESCRIPTION OF THE PREFERRED EMBODIMENTS

The present invention has the advantage that, in feeding the dust coal furnace in the entire control range from start-up through partial load to full load, a defined ratio of relative amounts of exhaust air and coal dust required for the formation of the flame can be set. A potential excess part of the dust-laden mill exhaust air is aintroduced into the tertiary air conduit without the use of a filter device and thus is diverted through the calciner and the pre-heater whereas the circulating mill air directed through the sifter is held constant.

In one embodiment of the invention, a stoichiometric portion of the primary air required for the formation of the kiln flame is diverted from the dust-laden exhaust air and is mixed with coal dust and burned. This technique has the advantage that a defined stoichiometric ratio between primary air and coal dust can be maintained so that the fuel to air ratio can be adjusted within known upper and lower limits without excessive grain occurring in the coal dust or without affecting the grinding system or the operation of the burning system.

In a preferred form of the invention, during start-up of the burning system, air introduced from the grinding system into the tertiary air conduit is burned with the addition of fuel. At least a part of the hot flue gases thus resulting is reintroduced into the grinding system and the remaining part of the flue gases is employed for heating the tertiary air conduit. The additional source of fuel can be coal dust or any other fuel source such as a liquid or gaseous fuel. In this embodiment, there is the advantage that the coal grinding system can be brought up to operating temperature together with the calciner and the pre-heater so that the burning system can be driven up to output relatively quickly. The tertiary air conduit can be heated together with the start-up of the grinding system. Experience has shown that enough coal dust is blown into the tertiary air conduit with sufficient air to produce a flue gas passed to the grinding stage having a temperature of approximately 800° C. The thermal energy required for starting the burning system and placing it in operation thereby needs only a very slight amount of liquid or gaseous fuels whereas the predominant portion of the thermal energy required for the starting-up operation is derived from the lower cost coal dust supply. In accordance with the present invention, the flame in the rotary kiln is placed in operation preferably toward the end of the heating-up stage of the grinding system and of the tertiary air conduit. Accordingly, after ignition of the kilm flame, the system which is already at least partially up to temperature can be run at full load after delivery of the material to be burned in a very short time. An important feature of the present invention is that the hot air required for the calciner and for the pre-heater is available due to firing of the tertiary air conduit long before the air can be taken from the cooler which at the beginning is still empty and cold.

Other features of the present invention include providing a flow control means in the line between the exhaust air line of the grinding system and the tertiary air conduit, rendering possible the introduction of the mill exhaust air into the tertiary air conduit. There may also be provided a flue gas line which connects the tertiary air conduit with the intake side of the grinding system as well as at least one auxiliary burner in the tertiary air conduit, preferably in the area of the tertiary air conduit on the cooler side which is connected to the exhaust air line of the grinding system.

The apparatus of the present invention is relatively uncomplicated and provides distinct advantages in cost with only a few component parts. In addition, the apparatus according to the present invention eliminates the necessity of a separate hot gas generator which normally must be present for the operation of the coal grinding system at least in start-up.

A further feature of the invention resides in providing at least one additional burner and/or a device for the introduction of fuel in the tertiary air conduit in the area of its discharge into the calciner, the further burner or fuel injection device being preferably connected to the exhaust air line of the grinding system. The additional provision of support burners or devices for the introduction of fuel makes it possible for the occurrence and maintenance of states of thermal equilibrium to be achieved at the areas of principal consumption by means of brief, controllable supply of thermal energy. The control of the burning system can thus be accomplished with simple means, independently of the operating state of the coal grinding system connected to the burning system and/or of the load of the cooler assembly serving as the hot air source.

Other features of the invention reside in providing control means in both the flue gas line as well as in the line supplying the grinding system with hot gas from the cooler, as well as in the primary air conduit of the rotary tubular kiln burner, and in the line leading to the tertiary air conduit. A further feature resides in providing a buffer storage silo for coal dust between the coal grinding system and the burner system. The provision of such a storage means provides a complete independence between the operation of the grinding system and the temporarily changing need of coal dust for firing of the burning system. This independence is further promoted in providing the grinding system with a grinder blower which has a bypass line leading from the output side of the mill blower to the discharge side of the grinding system, with a control element being preferably arranged in the bypass line. This bypass line guarantees in an uncomplicated manner that a constant flow amount of circulating mill air can be optimally set depending upon the output of the grinding assembly, independently of the burning system and its load conditions. Still another feature of the invention resides in providing a connection with a control means between the primary air conduit carrying coal dust and the flue gas line leading to the tertiary air conduit. This connection makes it possible to blow mill air containing coal dust into the tertiary air conduit.

Turning now to the FIGURE, there is shown a coal grinding system 1 being supplied with raw coal from a supply hopper 2 by means of a metering element 3, as schematically indicated by arrow 4. Ground coal dust passes by means of a line 5 from the sifters (not shown) of the coal grinding system 1 into a separator 6 and, after separation of gas, is introduced by a star feeder 7 into a buffer silo 8 by means of a line 9. The exhaust air separated from the finished product in the separator 6 and having only a relatively small amount of coal dust is supplied through a line 10 to the suction side of a mill blower 11 which conveys the exhaust gas into a circulating air line 12 in which there is disposed a control valve 13. Exhaust gas from the separator 6 is also conveyed into an exhaust air line 14. The branch line 15 is connected to the exhaust air line 14 at a junction 27, with another control element 16 being positioned in the line 15. Mill exhaust gas may be introduced into a tertiary air conduit 17 through this line 15. The tertiary air conduit 17 is on the one hand connected in common with the discharge end 18 of a rotary tubular kiln 19 which is located in a housing 20 which connects it to a cooler 21 on the gas side.

The flue gas line 15 discharges into the tertiary air conduit 17 and is delivered to a burner 22. There is also provided a fuel container 23, a fuel supply line 24, and a control element 25. A flame 26 generated by the burner 22 is indicated in a purely schematic manner in the tertiary air conduit 17. At the junction 27, the exhaust gas line 14 continues into a branch line 28 and is supplied with coal dust from the coal silo 8 by means of a metering device 30 together with a mixing means 29 as schematically indicated by the arrow 31. The mill exhaust air conveyed with blower pressure is supplied from the mixing means 29 through an injection line 28' to the burner 31 of the rotary tubular kiln 19 as primary air. A control element 32 is disposed in the injection line 28'. A line 33 is provided as a connection between the injection line 28' and the line 15, the line 33 being equipped with a control element 34. This line 33 permits controllable amounts of coal dust to be introduced into the gas line 15 which is blown, together with additional fuel from the fuel container 23 or without such additional fuel into the tertiary air conduit 17 to form the flame 26.

An important feature of the device is the hot gas line 35 which branches off from the tertiary air conduit 17 in the area of the flame 26, the hot gas line 35 introducing hot gas to the intake side 37 of the coal grinding system 1 in an amount which can be adjusted by means of a control element 36, as schematically indicated by arrows 38 and 39. Further, a hot gas line 41 containing a control element 42 branches off from the cooler 21 at the location 40 to supply the coal grinding system 1 with hot gas for the purpose of drying the coal to be ground. An additional burner element 45 or device for introduction of fuel is located in the tertiary air line 17 in the area of its discharge into the calciner and is preferably connected to the exhaust air line 14 of the grinding system 1.

The operation of the system shown can be described as follows. Initially, the control elements 13, 16, 25, 32, 34, 36 and 42 which normally will be remotely controlled from a central command position are closed. For start-up, the mill ventilator 11 is placed in operation. After the control element 16 is opened, essentially cold air is first blown from the grinding system 1 through the burner 22 into the tertiary air conduit 17. After the fuel valve 25 has been opened and the flame 26 ignited, the flame generates hot gas which streams through the tertiary air conduit 17 as well as the other elements of the cement making apparatus such as the calciner and the pre-heater. To permit a controlled gas stream to develop, an exhaust gas ventilator (not illustrated) of the burning system is placed in operation simultaneously with the mill blower. As soon as the flame 26 produces hot gas, the control element 36 in the hot gas line 35 is opened and as a result a part of the hot flue gas is introduced into the coal grinding system at location 37. By means of lines 5 and 10, the gas after emitting heat in the coal grinding system 1 arrives at the suction side of the mill ventilator 11 and is blown through lines 14 and 15 into the burner 22. In case the oxygen content in the air supplied to the burner 22 should fall below an admissible value, the control element 42 allows cold fresh air to enter the coal grinding system 1 through the line 41 from the cooler 21 which is still cold and is operated step-wise until a permissible level has been attained.

In order to achieve a favorable ratio of cold fresh air and hot combustion air for the purpose of using the primary energy most efficiently, the mill circulating air line 12 is provided as a bypass line which is released after a short start-up time by opening the control element 13.

After the firing space surrounding the flame 26 within the tertiary air conduit 17 has been heated up, coal dust is fed to the burner 22 instead of the liquid or gaseous fuel which is supplied during ignition of the flame 26 from the fuel container 23. The control element 34 in the line 33 is at least partially opened and coal dust is introduced into the line 15 from the silo 8 by means of the metering distribution means 30 and the mixing means 29 through the lines 28' and 33. A soon as the tertiary air conduit 17 has been heated by the flame 26 to a temperature of approximately 800° C., the burner 31 of the rotary tubular kiln 19 is ignited after the control element 32 has been opened. A short time after the start-up of the burner 31, the pre-heated burning system is charged with the material to be burned and the system is quickly run up from partial load through average load to full load. As soon as the cooler begins to fill with hot, calcined material, the cool air blower 44 positioned in the cool air line 43 is placed in operation and, upon generation of hot cooling gas, the cooling of the calcined material becomes effective in cooler 21. Since the coal grinding system 1 is now supplied with hot gas through the line 41, the flame 26 in the tertiary air conduit 17 can be operated at a reduced level or, under certain conditions, can be extinguished by reducing the fuel according to the heat requirements of the system supplied with hot gas from the tertiary air conduit. Consequently, the mill blower 11 continues to supply the burner 31 of the rotary tubular kiln 19 with preheated primary air from the grinding system 1 through lines 14, 28 and 28'. Coal dust in the required stoichiometric amount is admixed with this primary air from the coal silo 8 in the mixing chamber 29 by means of the metering device 30. A part of the circulating mill air is branched off from the output side of the mill ventilator 11 and is recirculated into the coal grinding system 1 at the location 37 through the bypass circulating air line 12 and its control element 13. A further portion of the circulating mill air is branched off from the line 14 at location 27 and continues to be blown into the tertiary air conduit 17 through the line 15 and the control element 16 by means of the burner 22, with or without fuel. Gas branched off from the tertiary air conduit 17 is likewise supplied in controlled amounts as needed to the grinding system at the intake side 37 through the flue gas line 35 and the control element 36.

With the features of the present invention, the grinding system and the burning system can be coupled in a simple manner at a small cost and operated at their optimum operating states independently from each other without influencing one another in an injurious manner.

The present invention is not limited to the example illustrated but instead comprises structural variations and embodiments lying within the skill of one skilled in the art, insofar as they appear within the scope of the patent claims.

We claim as our invention:

1. In a method for drying and pulverizing coal for use in a cement making process including a pre-heating step, a calcining step, a sintering step in a rotary kiln, and a cooling step, wherein air heated in said cooling step is returned into said calcining step through a tertiary air conduit, the improvement which comprises:
    grinding the coal, and
    directing at least a part of the dust-laden air from said grinding into said tertiary air conduit.

2. A method according to claim 1 which includes the steps of:
    collecting a portion of said dust-laden air from said grinding,
    mixing the collected portion with coal dust, and
    burning the resulting mixture in the sintering step.

3. A method according to claim 1 which includes the steps of:
    during start-up, adding a separate fuel to air passing through the grinding step, burning the resulting mixture in said tertiary air conduit to thereby heat the same, and
    passing hot flue gases from said tertiary air conduit back into said grinding step.

4. A method according to claim 3 in which:
    sufficient coal dust is passed into said tertiary air conduit together with sufficient air from the grinding step to heat the gases being passed to said grinding step to an operating temperature of approximately 800° C.

5. A method according to claim 4 which includes the step of:
    firing said rotary kiln as the grinding step approaches said operating temperature.

6. An apparatus for making cement which comprises:
    a pre-heater stage,
    a calcining stage,
    a rotary kiln receiving the treated materials from said calcining stage,
    a cooling stage receiving particles from said rotary kiln,
    a tertiary air conduit delivering heated air from said cooling stage into said calcining stage,
    burner means in said tertiary air conduit,
    a grinding stage for grinding coal, and
    means directing at least a portion of the dust-laden air from said grinding stage into said burner means.

7. An apparatus according to claim 6 which includes:

means for controlling the amount of dust-laden air passing from said grinding stage into said burner means.

8. An apparatus according to claim 6 which includes:
conduit means connecting said tertiary air conduit to the intake side of said grinding stage, and
means for supplying a separate source of fuel to said burner means.

9. An apparatus according to claim 8 which includes:
an additional burner in said tertiary air conduit and connected to the exhaust of said grinding stage.

10. A device according to claim 8 which includes:
means in said conduit for controlling the amount of flue gas passed from said tertiary air line to said intake side of said grinding stage, and
means for controlling the amount of hot gases passing from said cooler to said grinding stage.

11. An apparatus according to claim 8 which includes:
storage means for coal dust located between said grinding stage and said rotary kiln.

12. An apparatus according to claim 8 which includes:
a blower for removing dust-laden air from said grinding stage,
conduit means for directing a portion of the blower output into the inlet of said grinding stage, and
a control means in said conduit means for controlling the amount of flow therethrough.

13. An apparatus according to claim 8 which includes:
a branch line bridging between the inlet to said burner means and the inlet to said rotary kiln, and
control means regulating the amount of flow in said branch line.

* * * * *